United States Patent
Yui et al.

(10) Patent No.: US 11,770,037 B2
(45) Date of Patent: Sep. 26, 2023

(54) MOTOR, ACTUATOR, AND MANUFACTURING METHOD OF ROTOR PROVIDED AT MOTOR

(71) Applicant: AISIN CORPORATION, Kariya (JP)

(72) Inventors: Hiroaki Yui, Kariya (JP); Hiroki Ume, Kariya (JP); Hideaki Kato, Kariya (JP); Takahiro Sonoda, Kariya (JP)

(73) Assignee: AISIN CORPORATION, Aichi (JP)

( * ) Notice: Subject to any disclaimer, the term of this patent is extended or adjusted under 35 U.S.C. 154(b) by 224 days.

(21) Appl. No.: 17/199,572

(22) Filed: Mar. 12, 2021

(65) Prior Publication Data

US 2021/0305860 A1    Sep. 30, 2021

(30) Foreign Application Priority Data

Mar. 26, 2020 (JP) ................................ 2020-056827

(51) Int. Cl.
*H02K 1/00* (2006.01)
*H02K 1/276* (2022.01)
*B62D 5/04* (2006.01)
*H02K 15/03* (2006.01)

(52) U.S. Cl.
CPC ............... *H02K 1/276* (2013.01); *B62D 5/04* (2013.01); *H02K 15/03* (2013.01)

(58) Field of Classification Search
CPC .......... H02K 1/276; H02K 15/03; H02K 1/28; H02K 1/2773; H02K 1/27; H02K 2213/03; B62D 5/04
See application file for complete search history.

(56) References Cited

U.S. PATENT DOCUMENTS

| 9,559,555 B2* | 1/2017 | Wakita ................. H02K 1/2773 |
| 10,284,037 B2* | 5/2019 | Miyajima ............ H02K 1/2773 |
| 2013/0038161 A1* | 2/2013 | Pan ...................... H02K 1/2773 310/156.01 |

(Continued)

FOREIGN PATENT DOCUMENTS

| DE | 10 2011 084 292 A1 | 4/2013 |
| DE | 102011084292 A1 * | 4/2013 |

(Continued)

OTHER PUBLICATIONS

The extended European Search Report dated Aug. 6, 2021, by the European Patent Office in corresponding European Patent Application No. 21164415.8-1201. (9 pages).

*Primary Examiner* — Quyen P Leung
*Assistant Examiner* — Elrasheed E. B. Hamdan
(74) *Attorney, Agent, or Firm* — BUCHANAN INGERSOLL & ROONEY PC

(57) ABSTRACT

A motor includes a rotor configured to rotate with a shaft. The rotor includes a plurality of yoke portions and a plurality of holding portions each corresponding to a space portion provided between the adjacent yoke portions and configured to hold therein a magnet. At least one of the plurality of yoke portions includes a tab portion extending towards the holding portion and configured to hold the magnet held in the holding portion. The holding portion includes an insertion space provided between a first end portion of the yoke portion in an axial direction of the shaft and the tab portion. The insertion space allows the magnet to be inserted into the insertion space towards an inner side in a radial direction of the shaft.

9 Claims, 7 Drawing Sheets

(56) References Cited

U.S. PATENT DOCUMENTS

2014/0034411 A1* 2/2014 Sandholzer ............... B62B 1/16
                                                                                70/183
2018/0362079 A1* 12/2018 Zuzelski ................... B62D 5/04
2019/0319504 A1* 10/2019 Shiraishi .............. H02K 1/2773

FOREIGN PATENT DOCUMENTS

| DE | 10 2016 212 328 A1 | | 1/2018 |
|---|---|---|---|
| DE | 102016212328 A1 | * | 1/2018 |
| EP | 3410573 A1 | * | 12/2018 |
| EP | 3410573 A1 | | 12/2018 |
| JP | H089599 A | | 1/1996 |
| JP | 3425176 B2 | | 7/2003 |
| JP | 2013123365 A | * | 6/2013 |
| JP | 6385712 B2 | | 9/2018 |
| WO | WO-2010006737-A1 | * | 1/2010 |

* cited by examiner

MOTOR, ACTUATOR, AND MANUFACTURING METHOD OF ROTOR PROVIDED AT MOTOR

CROSS REFERENCE TO RELATED APPLICATIONS

This application is based on and claims priority under 35 U.S.C. § 119 to Japanese Patent Application 2020-056827, filed on Mar. 26, 2020, the entire content of which is incorporated herein by reference.

TECHNICAL FIELD

This disclosure generally relates to a motor, an actuator, and a manufacturing method of a rotor provided at a motor.

BACKGROUND DISCUSSION

Conventionally, a spoke-type rotor at which magnets and yoke portions each including a fan-shape are alternately arranged around an annular core portion into which a shaft is inserted is used for a motor. For example, JP6385712B2 (which will be hereinafter referred to also as Patent reference 1) discloses a structure in which short circuit of magnetic flux can be restricted from occurring by magnetic flux blocking parts arranged at an inner circumferential portion of a rotor including a spoke-type magnet arrangement.

With the use of the spoke-type rotor, a motor which is small in size and high in output can be manufactured. At the spoke-type rotor, however, each magnet including a shape elongated in an axial direction of a shaft needs to be attached along the axial direction of the shaft into a space portion (a holding portion) formed between the adjacent yoke portions highly accurately, the space portion which is, and accordingly the assembling performance is generally poor.

In addition, the assembling performance when the magnets are being attached to the rotor is influenced by magnetic forces of the magnets. Methods of attaching the magnets to the rotor includes a pre-magnetization attaching method in which magnetic material that has not been magnetized is attached to the rotor and thereafter the magnetic material is magnetized, and a post-magnetization attaching method in which magnetized magnetic material is attached to the rotor. When applying the pre-magnetization attaching method to the spoke-type rotor, the magnets (the magnetic material before magnetization) can be attached to the rotor without being influenced by the magnetic forces, and accordingly the assembling performance is relatively high. However, it is often difficult that the magnets are provided with enough magnetic forces. Accordingly, the magnets need to be large in size to obtain necessary output, and therefore reductions in size and weight of the motor may not be achieved. On the other hand, when applying the post-magnetization attaching method to the spoke-type rotor, the magnets can be provided with enough magnetic forces but the assembly performance is impaired by the influence of the magnetic forces.

A need thus exists for a motor, an actuator, and a manufacturing method of a rotor provided at a motor which are not susceptible to the drawback mentioned above.

SUMMARY

According to an aspect of this disclosure, a motor includes a rotor configured to rotate with a shaft. The rotor includes a plurality of yoke portions and a plurality of holding portions each corresponding to a space portion provided between the adjacent yoke portions and configured to hold therein a magnet. At least one of the plurality of yoke portions includes a tab portion extending towards the holding portion and configured to hold the magnet held in the holding portion. The holding portion includes an insertion space provided between a first end portion of the yoke portion in an axial direction of the shaft and the tab portion. The insertion space allows the magnet to be inserted into the insertion space towards an inner side in a radial direction of the shaft.

According to still another aspect of this disclosure, an actuator includes a motor including a rotor configured to rotate with a shaft. The rotor includes a plurality of yoke portions, and a plurality of holding portions each corresponds to a space portion provided between the adjacent yoke portions and configured to hold therein a magnet. At least one of the plurality of yoke portions includes a tab portion extending towards the holding portion and configured to hold the magnet held in the holding portion. The holding portion includes an insertion space provided between a first end portion of the yoke portion in an axial direction of the shaft and the tab portion. The insertion space allows the magnet to be inserted into the insertion space towards an inner side in a radial direction of the shaft.

According to still another aspect of this disclosure, a manufacturing method of a rotor configured to be provided at a motor and to rotate with a shaft includes a magnetizing process of magnetizing magnetic material and generating magnet, an attaching process of attaching the magnet to the rotor. The rotor includes a plurality of yoke portions, and a plurality of holding portions each corresponds to a space portion provided between the adjacent yoke portions and configured to hold therein the magnet. At least one of the yoke portions includes a tab portion extending towards the holding portion and configured to hold the magnet held in the holding portion. The holding portion includes an insertion space provided between a first end portion of the yoke portion in an axial direction of the shaft and the tab portion. The insertion space allows the magnet to be inserted towards an inner side in a radial direction of the shaft. The attaching process includes a first process of inserting the magnet into the insertion space towards an inner side in the radial direction and a second process of inserting the magnet in the axial direction after the first process.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of the present disclosure will be described in detail with reference to the drawings.

Figure 1:
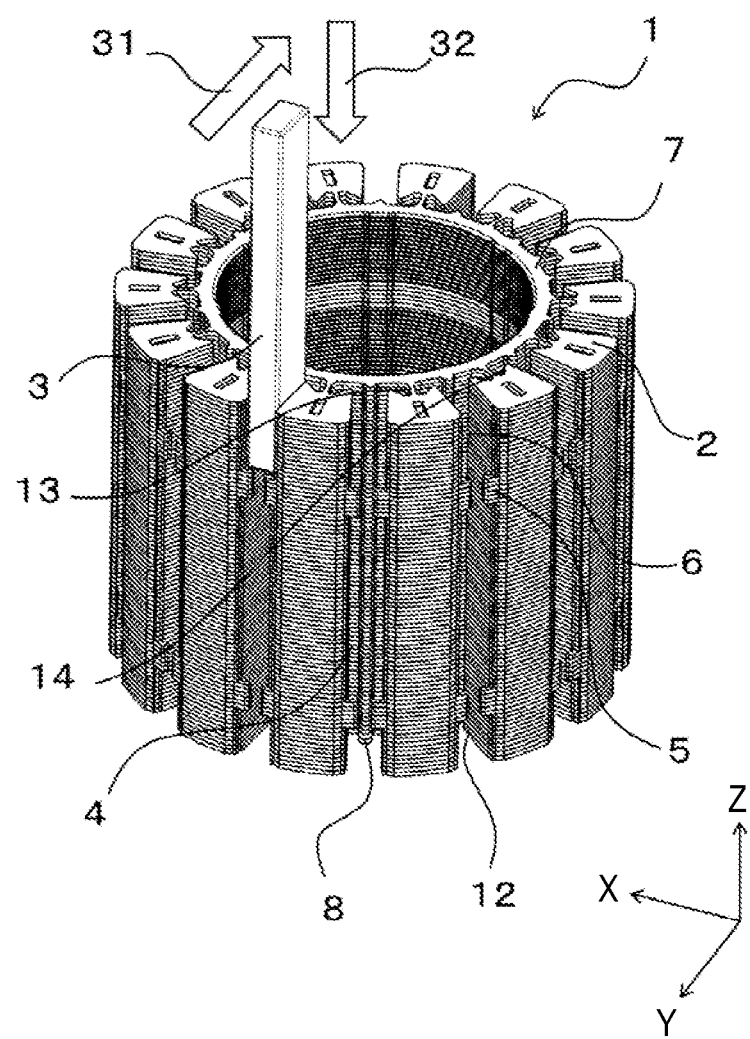
FIG. 1 is a perspective view of a rotor to which magnets are to be assembled, according to an embodiment disclosed here.
Figure 2:
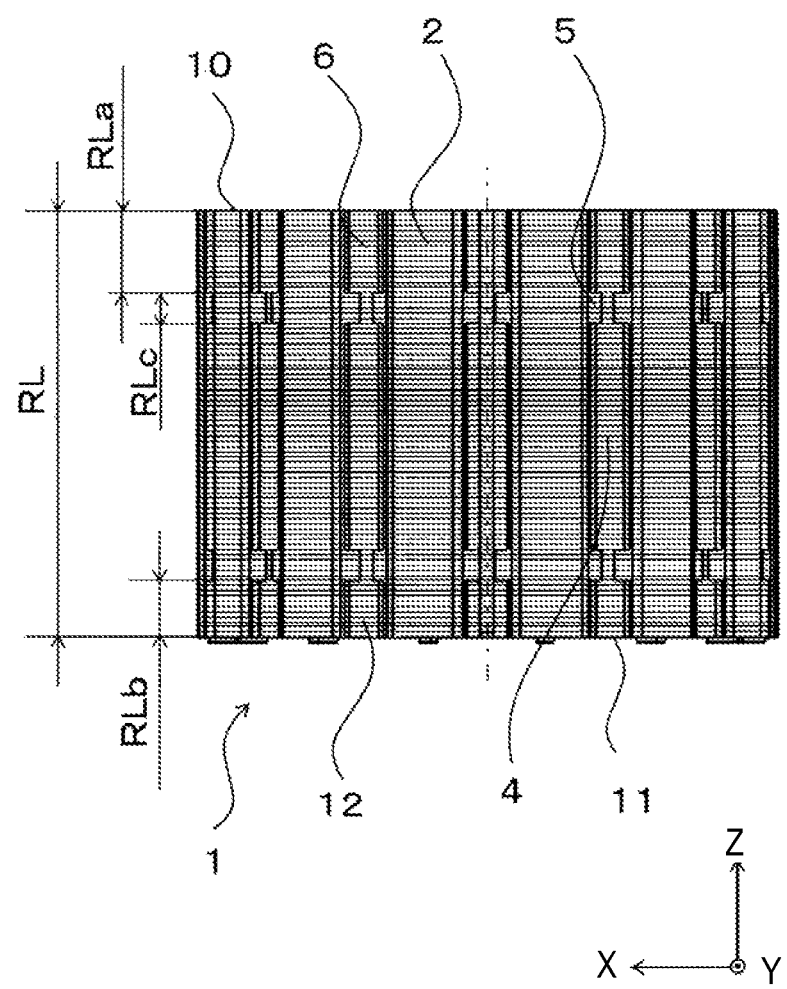
FIG. 2 is a front view of the rotor.
Figure 3:
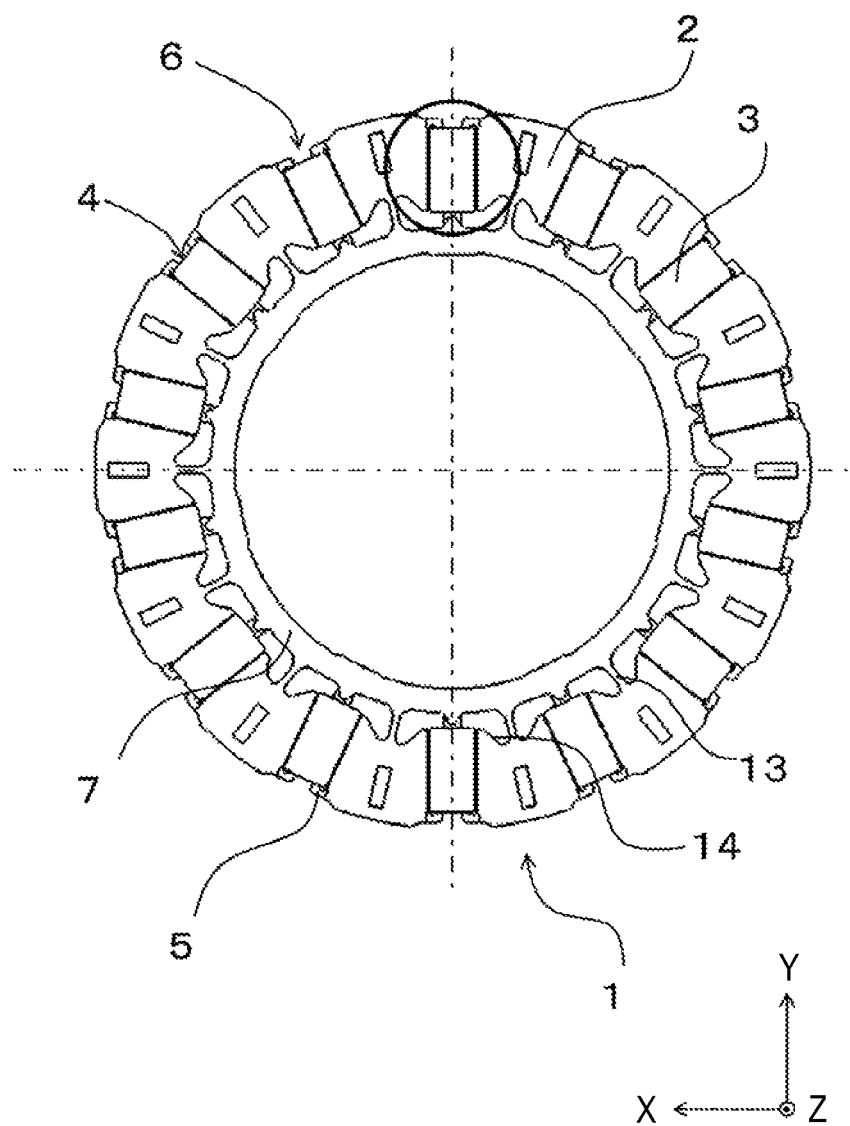
FIG. 3 is a top view of the rotor to which the magnets are assembled.
Figure 4:
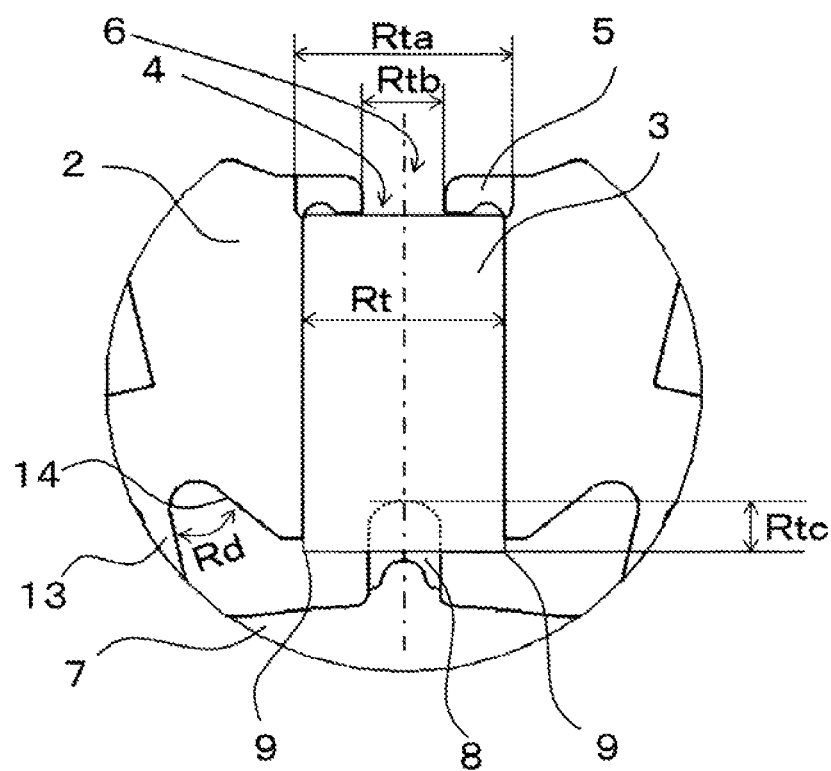
FIG. 4 is an enlarged view of a holding portion of FIG. 3, according to the embodiment.

A rotor configured to be provided at a motor will be described. FIG. 1 is a perspective view of a rotor 1 to which a magnet 3 is to be attached. FIG. 2 is a front view of the rotor 1. FIG. 3 is a top view of the rotor 1 to which the magnets 3 are attached. FIG. 4 is an enlarged view of a holding portion 4 illustrated in FIG. 3.

The rotor 1 configures a part of a motor and is a unit that rotates with an output shaft of the motor. The rotor 1 includes plural yoke portions 2, plural magnets 3, and holding portions 4 each of which corresponds to a space portion holding therein the magnet 3. The holding portion 4 is formed between the adjacent yoke portions 2. The magnets 3 are held and retained in the holding portions 4, and accordingly the rotor 1 includes a spoke-type magnet arrangement. In the embodiment, the rotor 1 is configured by laminated bodies including thin plates stacked on each other, however, the rotor 1 may be configured by a single member.

The yoke portion 2 includes a tab portion 5 formed to extend towards the holding portion 4. In the embodiment, the tab portions 5 are extended from the adjacent yoke portions 2, which are adjacent to each other, towards the holding portion 4 formed between the adjacent yoke portions 2.

A distance Rtb between the tab portions 5 which oppose or face each other may be 2.0 mm or less. Because the distance between the tab portions 5 is 2.0 mm or smaller, a holding force holding the magnet is maintained even when centrifugal force is applied to the magnet 3 as the rotor 1 rotates, thereby preventing the magnet 3 from falling out to the outside the rotor 1. The distance Rtb between the tab portions 5 may be 1.0 mm or more. Because the distance from the tab portion 5 to the other tab portion 5 is 1.0 mm or larger, a contact area of the tab portions 5 and the magnet 3 to each other is reduced, thereby preventing the output of the motor from being decreased due to a decrease of magnetic flux density. When the distance Rtb between the tab portions 5 is 1.0 mm or more and 2.0 mm or less, both effects of the holding force of the magnet 3 and the prevention of decrement in the motor output are obtained.

In the present embodiment, the tab portion 5 is configured to extend from each of the adjacent yoke portions 2 towards the holding portion 4 formed by the adjacent yoke portions 2, however, the tab portion 5 may be configured to extend from either one of the adjacent yoke portions 2 towards the holding portion 4. In this case, the distance Rtb between the tab portions 5 corresponds to a distance from a distal end of the tab portion 5 to the adjacent yoke portion 2 from which the tab portion 5 is not extended.

A width RLc of the tab portions 5 in an axial direction (the z axial direction) of the output shaft may be 5.0 mm or less. By setting the width RLc at 5.0 mm or smaller than 5.0, a contact area of the tab portions 5 and the magnet 3 to each other is reduced, thereby preventing the output of the motor from being decreased due to a decrease of magnetic flux density. The width RLc of the tab portion 5 may be 0.3 mm or more. By setting the width RLc at 0.3 mm or larger than 0.3 mm, the magnet 3 may be prevented from falling out due to the centrifugal force generated when the rotor 1 rotates, thereby enhancing the holding force of the magnet 3. When the width RLc of the tab portion 5 is 0.3 mm or more and 5.0 mm or less, both effects of the holding force of the magnet 3 and the prevention of decrement in the motor output are obtained.

Each of the holding portions 4 of the embodiment includes an insertion space 6 provided between a first end portion 10 corresponding to an end portion of the yoke portion 2 in an axial direction and the tab portion 5 that is closest to the first end portion 10 in the axial direction. The insertion space 6 corresponds to a space portion into which the magnet 3 is inserted in a manner that the magnet 3 is moved from an outer side towards an inner side in a radial direction of the output shaft, when the magnet 3 is inserted into the holding portion 4.

A first length RLa corresponding to a length of the insertion space 6 in the axial direction may be such that a ratio RLa/RL is equal to 6.0% or more than 6.0%, where a length of the rotor 1 in the axial direction is a length RL. By setting the ratio at 6.0 percent or more, an assembling performance in inserting the magnet 3 into the insertion space 6 in the radial direction is enhanced enough. The ratio RLa/RL may be equal to 30.0% or less than 30.0%. By setting the ratio at 30.0% or smaller, the holding force that prevents the magnet 3 from being moved and displaced by the centrifugal force can be assured. When the ratio RLa/RL is 6.0% or more and 30.0% or less, both effects of the assembling performance relative to the insertion space 6 and the holding force preventing the displacement of the magnet 3 can be obtained. For example, both of the effects can be obtained in a case where the length RL is 41.5 mm, and the first length RLa is 2.5 mm or more and 12.45 mm or less. For example, both of the effects can be obtained in a case where the first length RLa is 8.0 mm, and the length RL is 26.7 mm or more and 132.8 mm or less.

The insertion space 6 includes an opening portion opening towards the outer side of the radial direction, and a distance of the opening portion in a circumferential direction is an opening distance Rta. The opening distance Rta is larger than an insertion distance Rt corresponding to a distance of an inner portion of the insertion space 6 in the circumferential direction. Accordingly, the assembling performance of inserting the magnet 3 into the insertion space 6 in the radial direction is enhanced.

The rotor 1 includes a core portion 7 connected to all of the yoke portions 2 at the inner side in the radial direction. The core portion 7 includes a contact portion 8 at a second end portion 11 in the axial direction. The contact portion 8 is a portion which is in contact with an end portion of the magnet 3 at a side of the second end portion 11 so that the magnet 3 is prevented from being inserted beyond the second end portion 11 when being inserted into the holding portion 4 in the axial direction. A contact length Rtc is a length of the contact portion 8 in the radial direction and may be equal to 0.5 mm or more than 0.5 mm. Since the contact length Rtc is 0.5 mm or longer, the magnet 3 is reliably prevented from being inserted beyond a specified position, thereby enhancing the assembling performance of the magnet 3.

The holding portion 4 of the embodiment includes an end space 12 provided at a side of the second end portion 11. A length of the end space 12 in the axial direction is a second length RLb, and the second length RLb differs from the first length RLa (for example, RLa>RLb in the embodiment). Because the first length RLa and the second length RLb differ from each other, the upper side and the lower side of the rotor 1 are distinguishable from each other when the rotor 1 is placed for the insertion of the magnet 3 into the holding portion 4, thereby preventing the magnet 3 being assembled in a wrong way. Either one of the first length RLa and the second length RLb may be longer than the other from the standpoint of prevention of the assembly error, however, the relation of RLa>RLb may be desirable from the standpoint of the assembling performance when the magnet 3 is being inserted into the insertion space 6.

The tab portion 5 is formed at two places in one holding portion 4 according to the embodiment, however, the tab portion 5 may be formed at one place, or at three places or more. In a case where the tab portion 5 is formed at one place, costs for processing or forming the tab portion 5 may be reduced. By increasing the places at which the tab portions 5 are formed, the holding force of the magnet 3 increases, thereby reliably preventing the magnet 3 from falling out due to the centrifugal force generated during the rotations of the rotor 1.

An angle Rd formed by a connection portion 13 connecting the yoke portion 2 and the core portion 7 to each other, and an inner circumferential portion 14 of the yoke portion 2 may be 10°~90° (10 degrees to 90 degrees). In a case where the angle Rd is smaller than 10°, the processing is difficult, thereby increasing the cost. In a case where the angle Rd is larger than 90°, a contact area with the magnet 3 decreases, thereby decreasing a magnetic flux amount of the magnet 3 which is usable, and accordingly the output of the motor decreases.

In the embodiment, a corner portion 9 of the magnet 3 at the inner side in the radial direction is formed in a shape including a right angle, however, the corner portion 9 may be formed in an R-shape. In a case where the corner portion 9 includes the R-shape, an assembling performance when the magnet 3 is being inserted at a magnet insertion process A31 further enhances. In a case where the corner portion 9 includes chamfering including a C-chamfering, for example, the similar effect is obtained.

As stated above, since the rotor 1 of the embodiment includes the insertion space 6, the process of inserting the magnet 3 into the holding portion 4 can be divided into the magnet insertion process A31 (i.e., magnet insertion process 31) at which the magnet 3 is inserted from the outer side towards the inner side of the radial direction and a magnet insertion process B32 (i.e., magnet insertion process 32) at which the magnet 3 is inserted from the first end portion 10 to the second end portion 11 in the axial direction. Conventionally, the magnet 3 is inserted into the holding portion 4 only at the magnet insertion process B32 in the known technique. Accordingly, six parameters need to be controlled at the same time, the six parameters including an X-axis direction, a Y-axis direction and a Z-axis direction of the magnet 3, a rotation direction of the magnet 3 about the X-axis center, a rotation direction of the magnet 3 about the Y-axis center, and a rotation direction of the magnet 3 about the Z-axis center. Due to the insertion space 6, however, the magnet 3 can be inserted with simultaneous control of three parameters of the X-axis direction of the magnet 3, the rotation direction of the magnet 3 about the Y-axis center, and the rotation direction of the magnet 3 about the Z-axis center at the magnet insertion process A31. At the magnet insertion process B32, the magnet 3 can be inserted with simultaneous control of the other three parameters of the Y-axis direction of the magnet 3, the Z-axis direction of the magnet 3, and the rotation direction of the magnet 3 about the X-axis center. Consequently, the number of the parameters need to be controlled at the same time at one process is reduced, and thus the attachment of the magnet becomes easy, thereby enhancing the assembling performance of the magnet 3.

Figure 5:
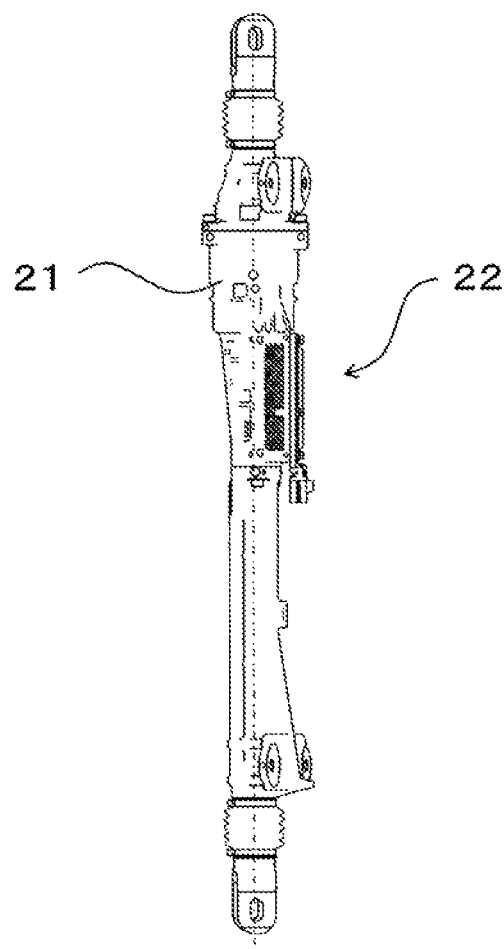
FIG. 5 is a view of an actuator on which the motor is mounted, according to the embodiment.

An actuator of the embodiment will be described. FIG. 5 is a view of an actuator 22 on which a motor 21 is mounted. The actuator 22 of the embodiment is mounted with the motor 21 including the rotor 1, and is used as one of units configuring an automobile. In this case, the output shaft connected to the rotor 1 may be connected to a wheel of the automobile, for example.

The motor 21 of the embodiment includes the above-described rotor 1 and can be reduced in size, for example. Accordingly, the actuator 22 mounted with the motor 21 of the embodiment can also be reduced in size. Thus, the actuator 22 can achieve mountability and reduction in weight.

Figure 6:
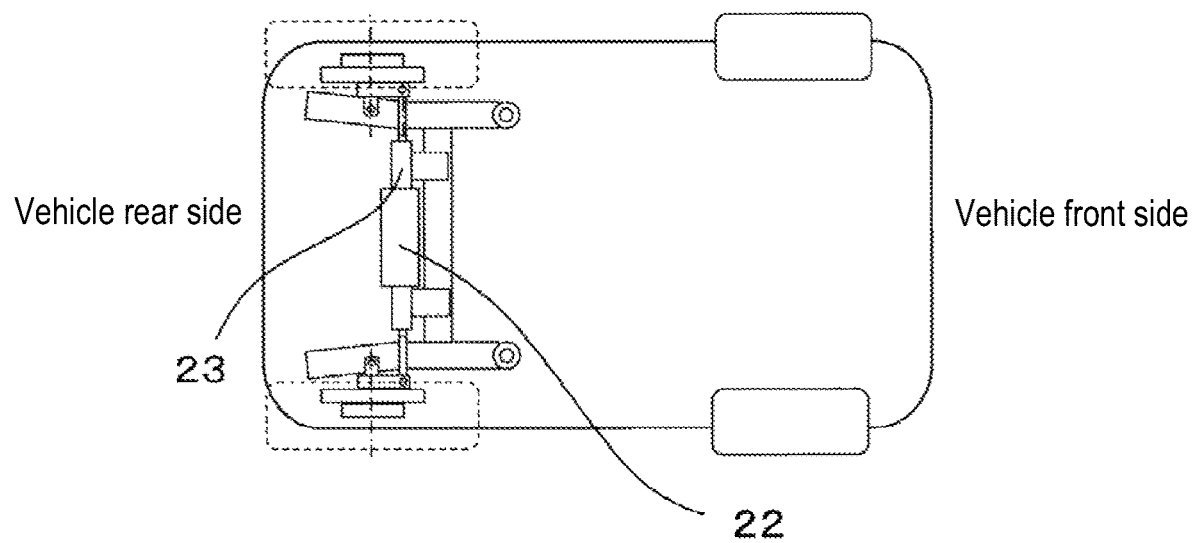
FIG. 6 is a view illustrating a state in which the actuator is mounted on a rear wheel steering system, according to the embodiment.

FIG. 6 is a view of a state in which the actuator 22 is mounted on a rear wheel steering system 23. Because the actuator 22 of the embodiment can be downsized as stated above, also the rear wheel steering system 23 mounted with the actuator 22 can be reduced in size, for example. Accordingly, a vehicle mounted with the rear wheel steering system 23 of the embodiment may be reduced in size and weight, and a fuel economy of the vehicle may be enhanced, for example.

Figure 7:
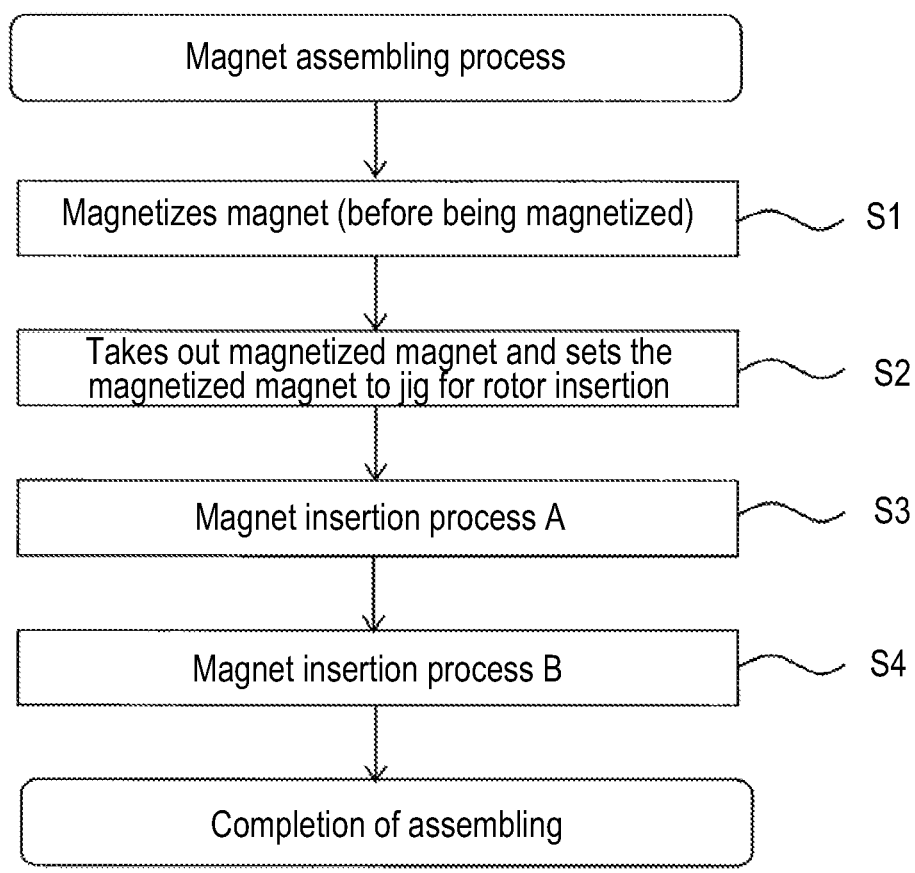
FIG. 7 is a view showing a manufacturing method of a rotor which is to be provided at a motor, according to the embodiment.

Next, a manufacturing method of the rotor configured to be provided at the motor according to the embodiment will be described. With reference to FIGS. 1 and 7, an assembling (attaching) process of assembling the magnet 3 relative to the rotor 1 provided at the motor 21 will be described.

Magnetizing process disclosed here will be described. In the embodiment, to manufacture the rotor 1 including the spoke-type magnet arrangement and having a high output, the magnetization is performed before the magnets 3 are assembled onto the rotor 1. By performing the magnetization of the magnet 3 (magnetic material) before the magnet 3 is assembled to the rotor 1, a magnetization rate of the magnet 3 is increased (Step S1).

Next, the magnet 3 that has been magnetized is taken out and then is set to a jig that is for assembling the magnet 3 onto the rotor 1 (Step S2).

Assembling process disclosed here will be described. After the magnet 3 is set to the assembling jig, the magnet 3 is inserted into the holding portion 4 by moving (parallel displacement) the magnet 3 towards the inner side in the radial direction from the insertion space 6, which serves as the magnet insertion process A31 (i.e., magnet insertion process A) corresponding to a first process of the assembly of the magnet 3 (Step S3, refer to FIG. 1).

Next, the magnet 3 is inserted into the holding portion 4 by moving the magnet 3 (perpendicular movement) towards the second end portion 11 along the axial direction, which serves as the magnet insertion process B32 (i.e., magnet insertion process B) corresponding to a second process of the assembly of the magnet 3) (Step S4, refer to FIG. 1). At this time, the magnet 3 is prevented by the contact portion 8 from moving beyond a hold position of the magnet 3 at which the magnet 3 is to be held. Thus, there is no need to re-adjust the hold position of the magnet 3.

According to the above-described manufacturing method, the magnet 3 including the high magnetization rate may be assembled onto the rotor 1 relatively easily. Accordingly, the motor 21 including a compact size and a high output can be manufactured with a high productivity.

The embodiment described above is presented as an example and is not provided to intend to limit the scope of the disclosure. This novel embodiment may be implemented in various manners other than the presented example, and various omissions, substitution and changes may be provided without departing from the scope of the disclosure. This embodiment and variations thereof are included in the scope and subject matter of the disclosure, and are included in the disclosure described in the scope of claims and a range of equivalents thereof.

According to the aforementioned embodiment, a motor 21 includes a rotor 1 configured to rotate with a shaft. The rotor 1 includes a plurality of yoke portions 2 and a plurality of holding portions 4 each corresponding to a space portion provided between the adjacent yoke portions 2 and configured to hold therein a magnet 3. At least one of the plurality of yoke portions 2 includes a tab portion 5 extending towards the holding portion 4 and configured to hold the magnet 3 held in the holding portion 4. The holding portion 4 includes an insertion space 6 provided between a first end portion 10 of the yoke portion 2 in an axial direction of the shaft and the tab portion 5. The insertion space 6 allows the magnet 3 to be inserted into the insertion space 6 towards an inner side in a radial direction of the shaft.

According to the above-described configuration, the holding portion 4 includes the insertion space 6 at the end portion of the yoke portion 2, and thus the end portion of the magnet 3 can be inserted from the insertion space 6 towards the inner side in the radial direction in a state where a lengthwise direction of the magnet 3 is parallel or substantially parallel to the axial direction, thereby enhancing the assembling performance of the magnet 3.

According to the aforementioned embodiment, the insertion space 6 includes an opening portion opening towards an outer side in the radial direction, and the opening portion includes an opening distance Rta corresponding to a distance in a circumferential direction of the shaft. The opening distance Rta is larger than an insertion distance Rt corresponding to a distance of the insertion space 6 in the circumferential direction at an inner side in the radial direction relative to the opening portion.

According to the above-described configuration, the opening distance Rta is larger than the insertion distance Rt, and thus the magnet 3 is inserted from the insertion space 6 towards the inner side of the radial direction more easily, thereby enhancing the assembling performance.

According to the aforementioned embodiment, the holding portion 4 includes an end space 12 provided between a second end portion 11 of the yoke portion 2 in the axial direction and the tab portion 5, and a first length RLa corresponding to a length of the insertion space 6 in the axial direction and a second length RLb corresponding to a length of the end space 12 in the axial direction differ from each other.

According to the above-described configuration, the first length RLa and the second length RLb differ from each other, and thus the upper side and the lower side of the rotor 1 are distinguishable from each other when the rotor 1 is placed for the insertion of the magnet 3 into the holding portion 4, thereby preventing the magnet 3 being assembled in a wrong way.

According to the aforementioned embodiment, the first length RLa is longer than the second length RLb.

According to the above-described configuration, the upper side and the lower side of the rotor 1 are distinguishable from each other when the rotor 1 is placed for the insertion of the magnet 3 into the holding portion 4, thereby preventing the magnet 3 being assembled in a wrong way. Further, by allowing the first length RLa of the insertion space 6, into which the magnet 3 is inserted, to be longer than the second length RLb of the end space 12, the magnet 3 can be easily inserted from the insertion space 6 radially inwardly. Consequently, the assembling performance is enhanced.

According to the aforementioned embodiment, the rotor 1 includes a core portion 7 connected to the plurality of yoke portions 2 at an inner side of the plurality of yoke portions 2 in the radial direction, and the core portion 7 includes a contact portion 8 being in contact with an axial end portion of the magnet 3 at the second end portion 11.

According to the above-described configuration, the contact portion 8 is provided at the axial end portion of the core portion 7 and the contact portion 8 is in contact with the axial end portion of the magnet 3. Thus, the contact portion 8 of the core portion 7 prevents the magnet 3 from being inserted further beyond the specified position when the magnet 3 is inserted into the insertion space in the axial direction. Consequently, there is no need to re-adjust the position of the magnet, which enhances the assembly performance.

According to the aforementioned embodiment, an actuator 22 includes a motor 21 including a rotor 1 configured to rotate with a shaft. The rotor 1 includes a plurality of yoke portions 2, and a plurality of holding portions 4 each corresponds to a space portion provided between the adjacent yoke portions 2 and configured to hold therein a magnet 3. At least one of the plurality of yoke portions 2 includes a tab portion 5 extending towards the holding portion 4 and configured to hold the magnet 3 held in the holding portion 4. The holding portion 4 includes an insertion space 6 provided between a first end portion 10 of the yoke portion 2 in an axial direction of the shaft and the tab portion 5. The insertion space 6 allows the magnet 3 to be inserted into the insertion space 6 towards an inner side in a radial direction of the shaft.

According to the above-described configuration, the motor 21 of the aforementioned embodiment may be reduced in its size, and thus the actuator 22 mounted with the motor 21 may also be reduced in its size, which contributes to the mountability and/or the reduction in weight.

According to the aforementioned embodiment, the shaft is configured to be connected to a wheel of a vehicle.

According to the above-described configuration, by applying the motor 21 and the actuator 22 both of which may be reduced in size, to the vehicle, the downsizing, the weight reduction, and enhancement of the fuel efficiency of the vehicle may be achieved, for example.

According to the aforementioned embodiment, the actuator 22 is used for a rear wheel steering system 23.

According to the above-described configuration, the vehicle provided with the rear wheel steering system 23 can achieve the downsizing, the weight reduction, and the enhancement of the fuel efficiency, for example.

According to the aforementioned embodiment, a manufacturing method of a rotor 1 configured to be provided at a motor 21 and to rotate with a shaft includes a magnetizing process of magnetizing magnetic material and generating magnet 3, an attaching process of attaching the magnet 3 to the rotor 1. The rotor 1 includes a plurality of yoke portions 2, and a plurality of holding portions 4 each corresponds to a space portion provided between the adjacent yoke portions 2 and configured to hold therein the magnet 3. At least one of the yoke portions 2 includes a tab portion 5 extending towards the holding portion 4 and configured to hold the magnet 3 held in the holding portion 4. The holding portion 4 includes an insertion space 6 provided between a first end portion 10 of the yoke portion 2 in an axial direction of the shaft and the tab portion 5. The insertion space 6 allows the magnet 3 to be inserted towards an inner side in a radial direction of the shaft. The attaching process includes a magnet insertion process (i.e., a first process) A31 of inserting the magnet 3 into the insertion space 6 towards an inner side in the radial direction and a magnet insertion process (i.e., a second process) B32 of inserting the magnet 3 in the axial direction after the magnet insertion process A31.

According to the above-described method, the end portion of the magnet 3 that has been magnetized at the magnetization process can be inserted from the insertion space 6 towards the inner side in the radial direction, and consequently, the assembling performance of the magnet 3 having the high magnetization rate may be enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motor comprising:
a rotor configured to rotate with a shaft;
the rotor including a plurality of yoke portions, and a plurality of holding portions each corresponding to a space portion provided between the adjacent yoke portions and configured to hold therein a magnet;
at least one of the plurality of yoke portions including a tab portion extending towards the holding portion and configured to hold the magnet held in the holding portion; and
the holding portion including an insertion space provided between a first end portion of the yoke portion in an axial direction of the shaft and the tab portion, the insertion space allowing the magnet to be inserted, from a position radially outward of the rotor, into the insertion space towards an inner side in a radial direction of the shaft.

2. The motor according to claim 1, wherein
the insertion space includes an opening portion opening towards an outer side in the radial direction, and the opening portion includes an opening distance corresponding to a distance in a circumferential direction of the shaft, and
the opening distance is larger than an insertion distance corresponding to a distance of the insertion space in the circumferential direction at an inner side in the radial direction relative to the opening portion.

3. The motor according to claim 1, wherein
the holding portion includes an end space provided between a second end portion of the yoke portion in the axial direction and the tab portion, and
a first length corresponding to a length of the insertion space in the axial direction and a second length corresponding to a length of the end space in the axial direction differ from each other.

4. The motor according to claim 3, wherein the first length is longer than the second length.

5. The motor according to claim 3, wherein
the rotor includes a core portion connected to the plurality of yoke portions at an inner side of the plurality of yoke portions in the radial direction, and
the core portion includes a contact portion being in contact with an axial end portion of the magnet at the second end portion.

6. An actuator comprising a motor, the motor including:
a rotor configured to rotate with a shaft;
the rotor including a plurality of yoke portions, and a plurality of holding portions each corresponding to a space portion provided between the adjacent yoke portions and configured to hold therein a magnet;
at least one of the plurality of yoke portions including a tab portion extending towards the holding portion and configured to hold the magnet held in the holding portion; and
the holding portion including an insertion space provided between a first end portion of the yoke portion in an axial direction of the shaft and the tab portion, the insertion space allowing the magnet to be inserted, from a position radially outward of the rotor, into the insertion space towards an inner side in a radial direction of the shaft.

7. The actuator according to claim 6, wherein the shaft is configured to be connected to a wheel of a vehicle.

8. The actuator according to claim 7, wherein the actuator is used for a rear wheel steering system.

9. A manufacturing method of a rotor configured to be provided at a motor and rotate with a shaft, the manufacturing method comprising:
a magnetizing process of magnetizing magnetic material and generating magnet;
an attaching process of attaching the magnet to the rotor;
the rotor including a plurality of yoke portions, and a plurality of holding portions each corresponding to a space portion provided between the adjacent yoke portions and configured to hold therein the magnet;
at least one of the yoke portions including a tab portion extending towards the holding portion and configured to hold the magnet held in the holding portion;
the holding portion including an insertion space provided between a first end portion of the yoke portion in an axial direction of the shaft and the tab portion, the insertion space allowing the magnet to be inserted into the insertion space towards an inner side in a radial direction of the shaft; and
the attaching process including a first process of inserting the magnet, from a position radially outward of the rotor, into the insertion space towards an inner side in the radial direction and a second process of inserting the magnet in the axial direction after the first process.

* * * * *